United States Patent
Verma et al.

(10) Patent No.: US 11,531,975 B2
(45) Date of Patent: Dec. 20, 2022

(54) NETWORK NODE MANAGEMENT ON A BLOCKCHAIN

(71) Applicant: International Business Machines Corporation, Armonk, NY (US)

(72) Inventors: Shalaka Verma, Mumbai (IN); Sarvesh Patel, Pune (IN); Kushal Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 15/952,892

(22) Filed: Apr. 13, 2018

(65) Prior Publication Data

US 2019/0318338 A1 Oct. 17, 2019

(51) Int. Cl.
| | |
|---|---|
| *G06F 16/2455* | (2019.01) |
| *G06Q 20/22* | (2012.01) |
| *H04L 67/104* | (2022.01) |
| *G06Q 20/06* | (2012.01) |
| *H04L 9/06* | (2006.01) |
| *G06F 16/176* | (2019.01) |

(52) U.S. Cl.
CPC ..... *G06Q 20/223* (2013.01); *G06F 16/24568* (2019.01); *G06Q 20/0655* (2013.01); *H04L 9/0637* (2013.01); *H04L 67/104* (2013.01); *G06F 16/1774* (2019.01)

(58) Field of Classification Search
CPC .............. G06Q 20/223; G06Q 20/0655; H04L 9/0637; H04L 67/104; G06F 16/24568; G06F 16/1774
See application file for complete search history.

(56) References Cited

U.S. PATENT DOCUMENTS

| | | | |
|---|---|---|---|
| 9,141,982 B2 | 9/2015 | Coppenolle et al. | |
| 2005/0268302 A1* | 12/2005 | Geib | G06F 9/4881 718/100 |
| 2011/0141124 A1* | 6/2011 | Halls | G06F 21/554 345/522 |
| 2012/0239814 A1* | 9/2012 | Mueller | G06F 9/5061 709/226 |
| 2016/0350352 A1* | 12/2016 | Hase | G06F 12/084 |
| 2017/0046689 A1 | 2/2017 | Lohe et al. | |
| 2017/0236123 A1* | 8/2017 | Ali | G06Q 20/3825 705/75 |
| 2017/0279774 A1 | 9/2017 | Booz et al. | |
| 2017/0329980 A1 | 11/2017 | Hu et al. | |
| 2018/0060496 A1* | 3/2018 | Bulleit | H04L 9/3239 |
| 2018/0341930 A1* | 11/2018 | Moir | G06Q 20/3825 |

(Continued)

OTHER PUBLICATIONS

Chunyao Song, Tingjian GE, Cindy Chen, and Jie Wang, "Soft Quorums: A High Availability Solution for Service Oriented Stream Systems," 2015 IEEE 35th International Conference on Distributed Computing Systems, Year: 2015, pp. 778-779.

(Continued)

*Primary Examiner* — Vaishali Shah

(57) ABSTRACT

An example operation may include one or more of identifying application instances in a cluster group, receiving a request to perform a consensus decision regarding ownership of the cluster group via peer nodes of a blockchain, identifying individual consensus decision votes from the peer nodes, and performing the consensus decision based on the individual consensus decision votes.

17 Claims, 12 Drawing Sheets

(56) References Cited

U.S. PATENT DOCUMENTS

| | | | | |
|---|---|---|---|---|
| 2019/0057379 | A1* | 2/2019 | Chalakudi | G06Q 20/38215 |
| 2019/0108542 | A1* | 4/2019 | Durvasula | G06Q 20/065 |
| 2019/0238634 | A1* | 8/2019 | Mohanta | G06F 11/1425 |
| 2019/0251199 | A1* | 8/2019 | Klianev | G06Q 40/04 |
| 2019/0251295 | A1* | 8/2019 | Vieyra | G06F 21/6218 |
| 2019/0289018 | A1* | 9/2019 | Metzger | B64G 1/10 |
| 2019/0318129 | A1* | 10/2019 | David | H04L 9/3239 |
| 2019/0349426 | A1* | 11/2019 | Smith | H04L 67/104 |

OTHER PUBLICATIONS

Junichi Kishigami, Shigeru Fujimura, Hiroki Watanabe, Atsushi Nakadaira, and Akihiko Akutsu, "The Blockchain-Based Digital Content Distribution System," 2015 IEEE Fifth International Conference on Big Data and Cloud Computing, Year: 2015, pp. 187-190.

Lakshmi Siva Sankar, M. Sindhu, and M. Sethumadhavan, "Survey of consensus protocols on blockchain applications," 2017 4th International Conference on Advanced Computing and Communication Systems (ICACCS), Year: 2017, pp. 1-5.

Xueping Liang, Sachin Shetty, Deepak Tosh, Charles Kamhoua, Kevin Kwiat, and Laurent Njilla, "ProvChain: A Blockchain-Based Data Provenance Architecture in Cloud Environment with Enhanced Privacy and Availability," 2017 17th IEEE/ACM International Symposium on Cluster, Cloud and Grid Computing (CCGRID), Year: 2017, pp. 468-477.

\* cited by examiner

NETWORK NODE MANAGEMENT ON A BLOCKCHAIN

TECHNICAL FIELD

This application generally relates to network node management, and more particularly, to performing split-brain avoidance by using quorum services, such as those associated with a blockchain.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

Conventionally, in a storage virtualization system, multiple nodes are connected to form a clustered system or network, which is responsible for input/output (IO) processing and storage virtualization. Compute nodes are connected via fabric links, and system metadata is kept at shared disks known as a 'quorum disk', which are being used at the time of a split-brain scenario. In the split-brain scenario, half of the cluster cannot identify the other half of the cluster, and the quorum disks are used to break the 'tie'. The first half, in a split-brain, scenario to reach the quorum disks assumes ownership of the cluster and locks the disks. All nodes in a cluster must have access to the quorum disks. Traditional ways to break the tie can be a small computer system interface (SCSI) based implementation in which cluster nodes try locking the quorum disk using SCSI commands and whichever locks the disk first wins the tie. This tie breaking approach does not consider other parameters and also becomes burdensome in case a number of nodes in the cluster are greater. In a cloud-based environment, where the applications are clustered, the SCSI based tie-breaking approach lags when a number of nodes where the application operates are large in number.

Generally, SCSI based approaches do not consider other factors, and are a first-come-first-lock type of approach. Current available mechanisms are not scalable where a number of nodes in the cluster (or application deployments) are larger. The typical storage systems work in node pairs (e.g., 2, 4, 6 . . . n), where a quorum needs to be added explicitly for tie-breaking. Current approaches do not provide quorum-as-a-service for applications in a tie breaking scenario, do not maintain records for vital node sites, including their information. The currently available approaches use SCSI, based on a proprietary mechanism, which has limitations in terms of scalability and functionality as the various parameters are not considered in such a traditional model of tie breaking.

SUMMARY

One example embodiment may provide a method that includes one or more of identifying application instances in a cluster group, receiving a request to perform a consensus decision regarding ownership of the cluster group via peer nodes of a blockchain, identifying individual consensus decision votes from the peer nodes, and performing the consensus decision based on the individual consensus decision votes.

Another example embodiment of the present application provides an apparatus that includes a processor configured to identify a plurality of application instances in a cluster group, a receiver configured to receive a request to perform a consensus decision regarding ownership of the cluster group via peer nodes of a blockchain, and the processor is further configured to identify individual consensus decision votes from the peer nodes, and perform the consensus decision based on the individual consensus decision votes.

Still another example embodiment may provide a non-transitory computer readable storage medium configured to store instructions that when executed cause a processor to perform one or more of identifying application instances in a cluster group, receiving a request to perform a consensus decision regarding ownership of the cluster group via peer nodes of a blockchain, identifying individual consensus decision votes from the peer nodes, and performing the consensus decision based on the individual consensus decision votes.

DETAILED DESCRIPTION

Figure 1A:
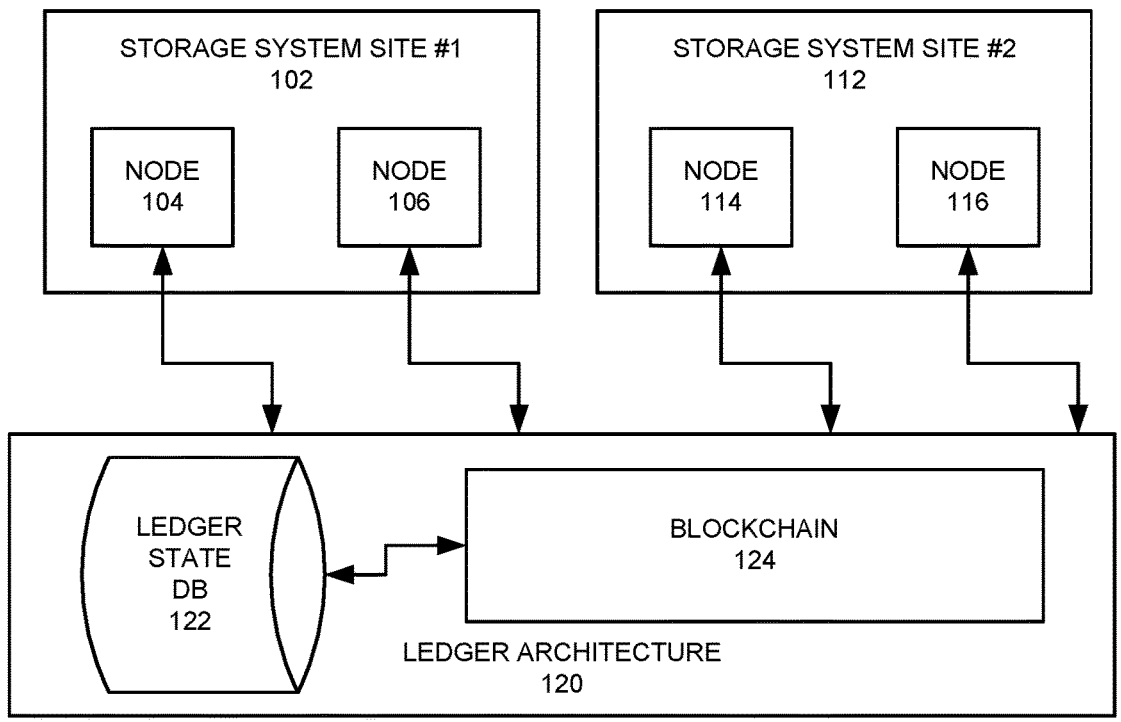
FIG. 1A illustrates a storage virtualization system connected to a ledger architecture, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which provide maintaining records for vital node sites, and a quorum as a service feature to provide accurate consensus decision making in split-brain scenarios. The blockchain configuration provides affinity to some network sites by permitting quorum data, which permits access to the site which has a larger number of dependent volumes, and which, in turns provides a service for selecting the site where more volumes are situated. Distributed metadata may be used for placement of clustered shared applications, such as storage arrays, which also provide the ability to bypass split-brain scenarios quickly using the blockchain.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockhcain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

FIG. 1A illustrates a storage virtualization system connected to a ledger architecture, according to example embodiments. Referring to FIG. 1A, the configuration 100A provides multiple storage system sites 102 and 112, each having respective nodes 104, 106, and 114 and 116. The nodes may communicate with a ledger architecture 120 with a ledger database 122 and a blockchain 124. Almost all clustered solutions rely on a third party arbitrator to avoid a split-brain network isolation scenario, in case of a cluster split-up. The arbitrator may be located outside the failure domain in which the participating members of the cluster reside. For cross-site clusters, this provides a requirement of adding an additional site. Along with being the ruling authority in times of contest, the arbitrator also stores and passes cluster data, and acts as a trusted source for receiving cluster related information as well as participates in monitoring cluster health.

Implementing a blockchain to provide cluster services may provide a distributed cluster configuration chain, which acts as an arbitrator for cluster decision making. For multisite clusters, the blockchain can provide a uniform guaranteed availability view of the cluster to all participating members. As a result, a decision can be performed through consensus based on a cluster state. Also, endorsers on the cluster blockchain can implement priority takeover rules and/or other actions that need to be executed as part of a cluster fencing etc., which can be executed as part of a smart contract. This type of blockchain configuration can operate as a quorum/cluster arbitrator service on certain industry networks, cloud networks, etc.

In FIG. 1A, the nodes in the storage systems sites 102 and 112 are the physical and/or logical virtual machine (VM) storage controllers, which are responsible for block based virtualization of attached back-end storage arrays. The nodes combine to form a cluster, which is represented as a single entity for the applications, and the cluster provides virtual disks to the host applications. The storage nodes are connected to the ledger 122 to perform blockchain enabled operations.

A client having deployments operating on different cloud computing platforms can use the blockchain service for automated failover/failback across cloud networks. All application specific information can be registered with the quorum service on the blockchain as cluster assets with a master owning those assets. The assets can be transferred to a secondary owner when certain conditions are met, which can be coded into the smart contract chaincode, and modified using a consensus algorithm operated by service endorsers and active members of the cluster. More specific to a storage area network volume controller (SVC) stretched cluster scenario, this approach can also maintain priorities and provide arbitration priority for providing control affinity to one site over another site based on a specific deployment. This implementation may also be integrated with messaging middleware, which simplifies and accelerates the integration of diverse applications and business data across multiple platforms to deliver universal messaging with a broad set of offerings to meet enterprise-wide messaging requirements, as well as connectivity for the Internet of things (IoT) and other clustered devices.

Figure 1B:
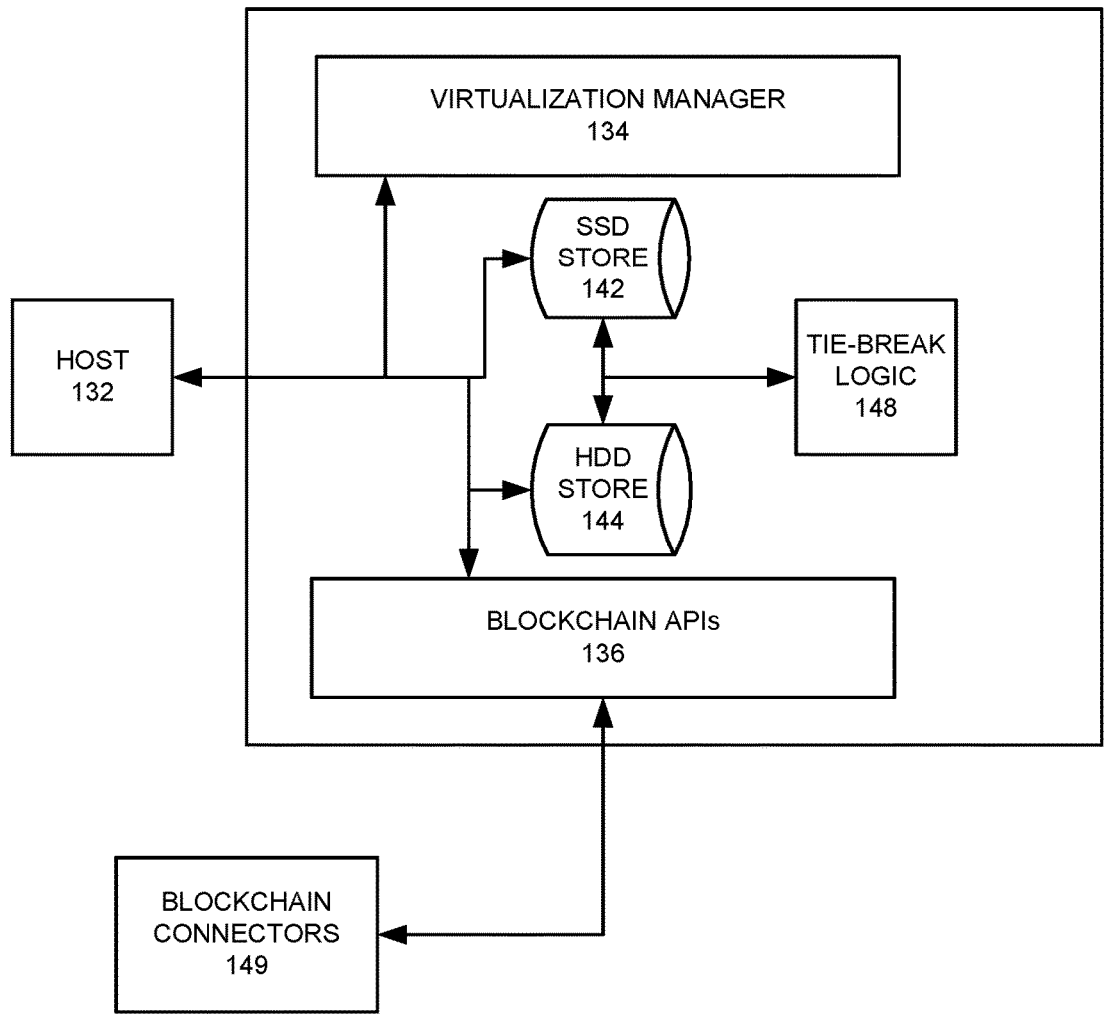
FIG. 1B illustrates a network diagram of application programming interface (API) connectors in a storage system, according to example embodiments.

FIG. 1B illustrates a network diagram of application programming interface (API) connectors in a storage system, according to example embodiments. Referring to FIG. 1B, the configuration 100B provides an example where a host 132 with a virtualization manager 134, blockchain APIs 136 and a SSD store 142 and a HDD store 144. As portions of a cluster, the data stores 142/144 may be subject to a split-brain scenario when the network undergoes certain changes. The tie-break logic 148 may be used to determine the actual cluster leader and other network attributes when the network requires such decisions. The blockchain connectors 149 may provide a way to reference the blockchain peers and rely on the quorum as a service feature of the blockchain to manage the decision making/tie-breaking logic. The API connectors in the storage systems indicate the architecture of the storage controller node. In the storage controller nodes, there are blockchain APIs in order to connect with the ledger in 122. Other parts of the node architecture may include the virtualization manger and a tie-breaking logic which is used when split brain conditions are detected in the cluster.

Figure 1C:
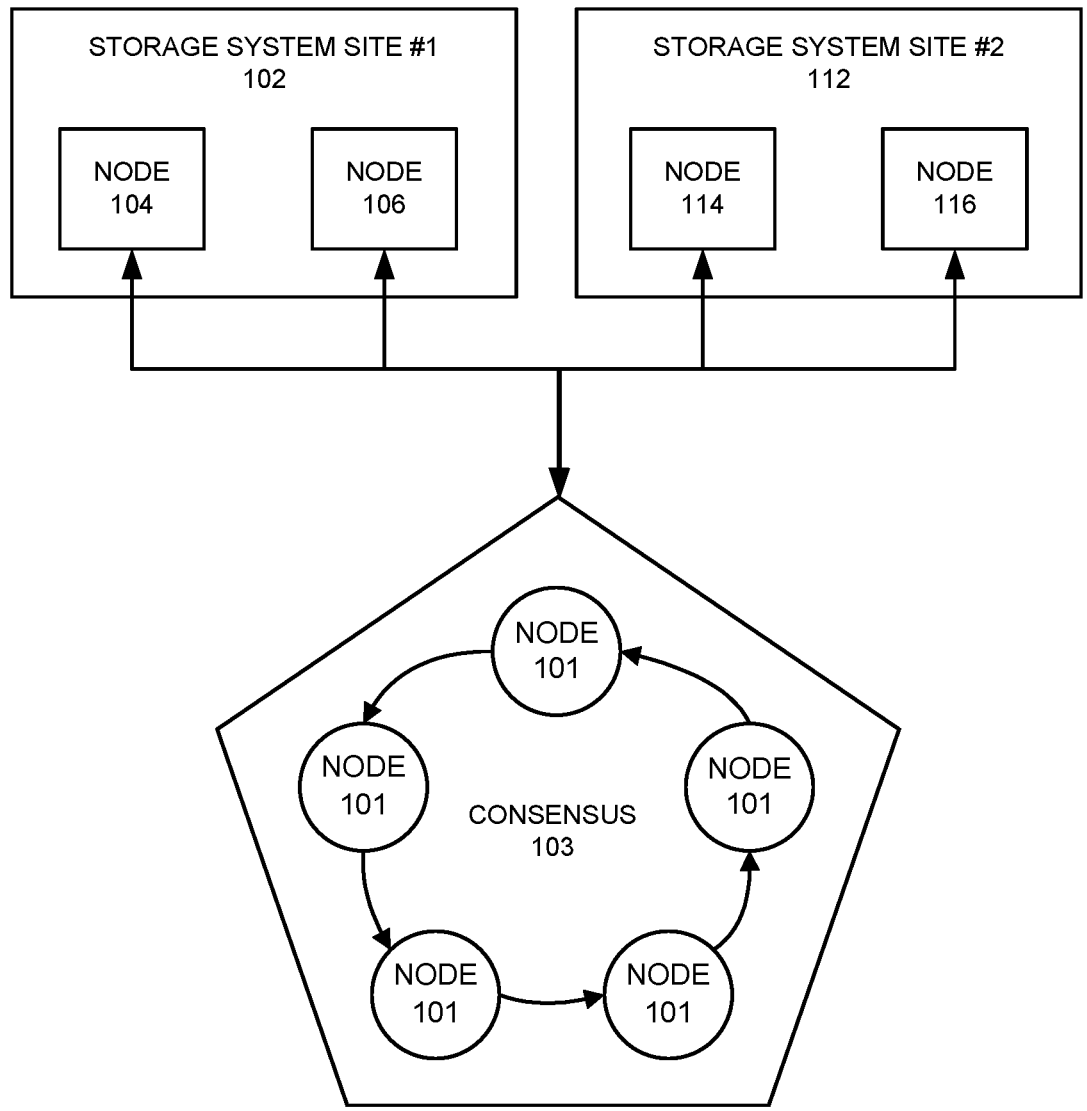
FIG. 1C illustrates a network diagram of storage system sites and a consensus network, according to example embodiments.

FIG. 1C illustrates a network diagram of storage system sites and a consensus network, according to example embodiments. Referring to FIG. 1C, the configuration 100C provides the storage system sites 102 and 112 sharing a consensus model 103 with peer nodes 101, which offer a consensus decision when necessary. In one example, clustered shared applications, which need metadata (i.e., quorum data) to operate are connected to a blockchain, which provides a quorum as a service to the registered applications. Once the quorum data is needed for applications situated on the nodes of the storage sites, a service request is sent to the blockchain quorum access (request query) feature. This triggers the batch computation inside the ledger and provides the requested information to the applications. The consensus network 103 uses as tie-breaker approach. This configuration indicates utilization of a consensus network for storage cluster tie-breaking logic. In the storage subsystem, when the half of the nodes are unable to reach the other half of the nodes, the nodes rely on the consensus network. Once the requests are submitted to the blockchain based consensus network, the network processes the data and performs the tie-breaking decisions.

Figure 1D:
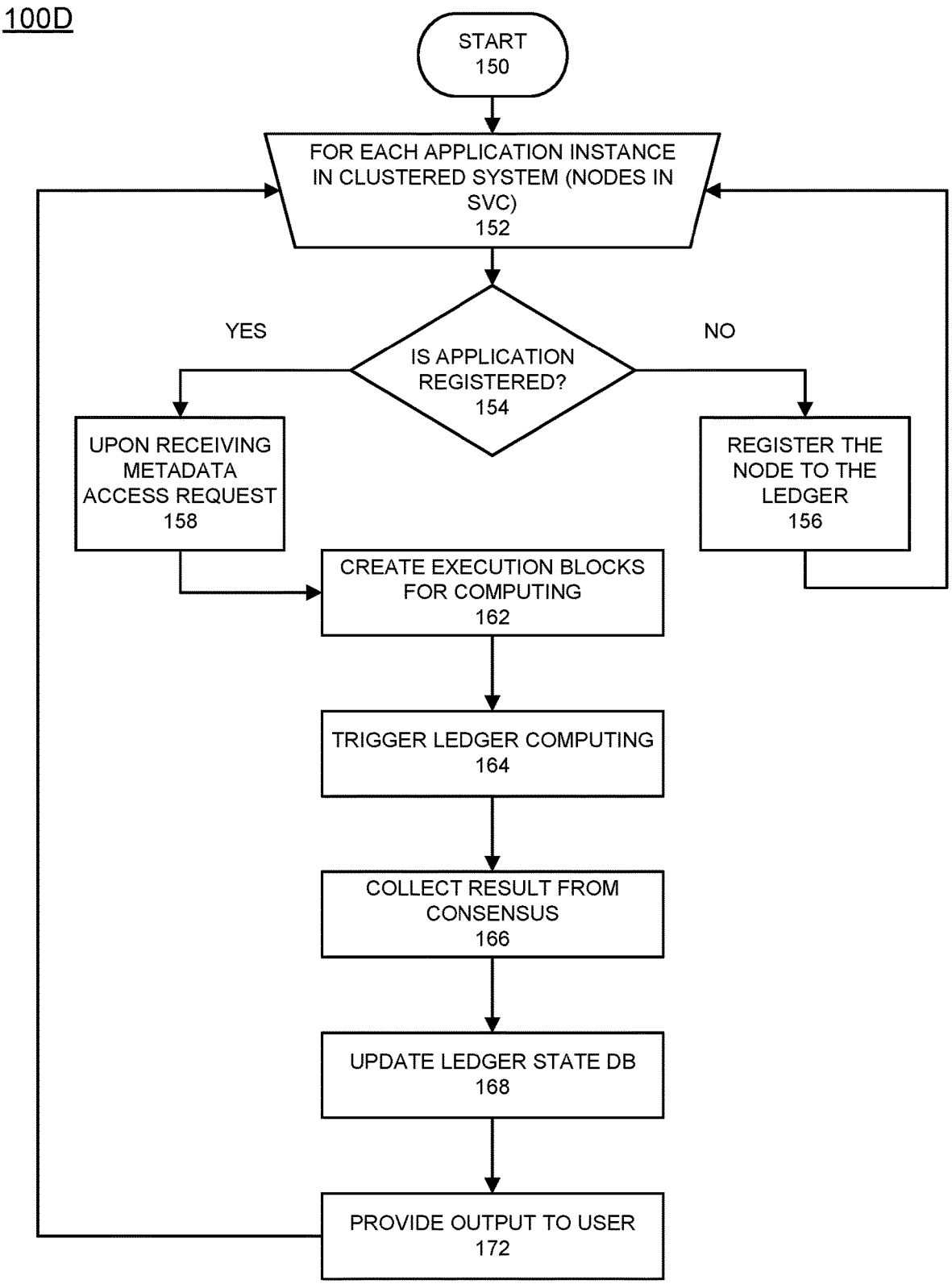
FIG. 1D illustrates a logic flow diagram of a system flow configuration for performing a tie-breaking consensus decision procedure, according to example embodiments.

FIG. 1D illustrates a logic flow diagram of a system flow configuration, according to example embodiments. Referring to FIG. 1D, the example 100D provides a process with a start operation 150 of a consensus procedure to perform a tie-breaking decision. In operation, the procedure may be performed for each application operating in a clustered network system 152. An initial determination may be made as to whether the application is registered 154, if not, the node associated with the application should be registered to the ledger 156. If so, then upon receiving a metadata access request 158, the execution blocks may be created to perform the computing 162. The application instances may be the storage node software applications.

In a storage cluster containing eight nodes, for example, there are eight parallel storage software instances operating in a coupling and represented as single cluster. For the metadata access request 158, the cluster requires the metadata to make tie-breaking decisions, such as quorum data received from each of the peer nodes. The quorum data is the cluster metadata, which is stored at multiple locations (i.e., each peer node) and used for storing vital system information. The trigger ledger performs computing 164 is performed once the split-brain situation is detected in the cluster, also the blockchain ledger is notified and the tie-breaking logic is performed. Once the information is processed by the ledger and one of the storage sites is elected as "active" based on the consensus 166, then this information is transferred back to the storage subsystem to perform further actions to activate the site. As one of the sites is activated by the storage controller cluster, then that activated site information is reported back to the state ledger database 168 to reflect the current state and to update the metadata. Providing the information as user output 172 is one of the additional operations performed to debug and enable use cases and for obtaining the information about the operations to make the transparency in case such information is needed.

In storage area network (SAN) volume controller's (SVCs) and enhanced stretched cluster implementations, there are generally multiple sites which must be configured so the third site is explicitly used for quorum and metadata placement. If the controller nodes in one of the sites goes down due to a disaster situation, then another node reads the metadata using a SCSI locking mechanism and resumes the IO serving activity from the second site. The same mechanism applies for the split-brain scenario and the site which locks the quorum metadata first wins the status and starts serving the IO requests. In this mechanism, the importance of a particular site should be identified while enabling overriding access. This idea proposes awareness, while locking the quorum metadata in case of a split-brain scenario. For example, if site #1 102 has more volumes than the site #2 112, then site #1 is prioritized in case of a split-brain scenario.

Figure 2A:
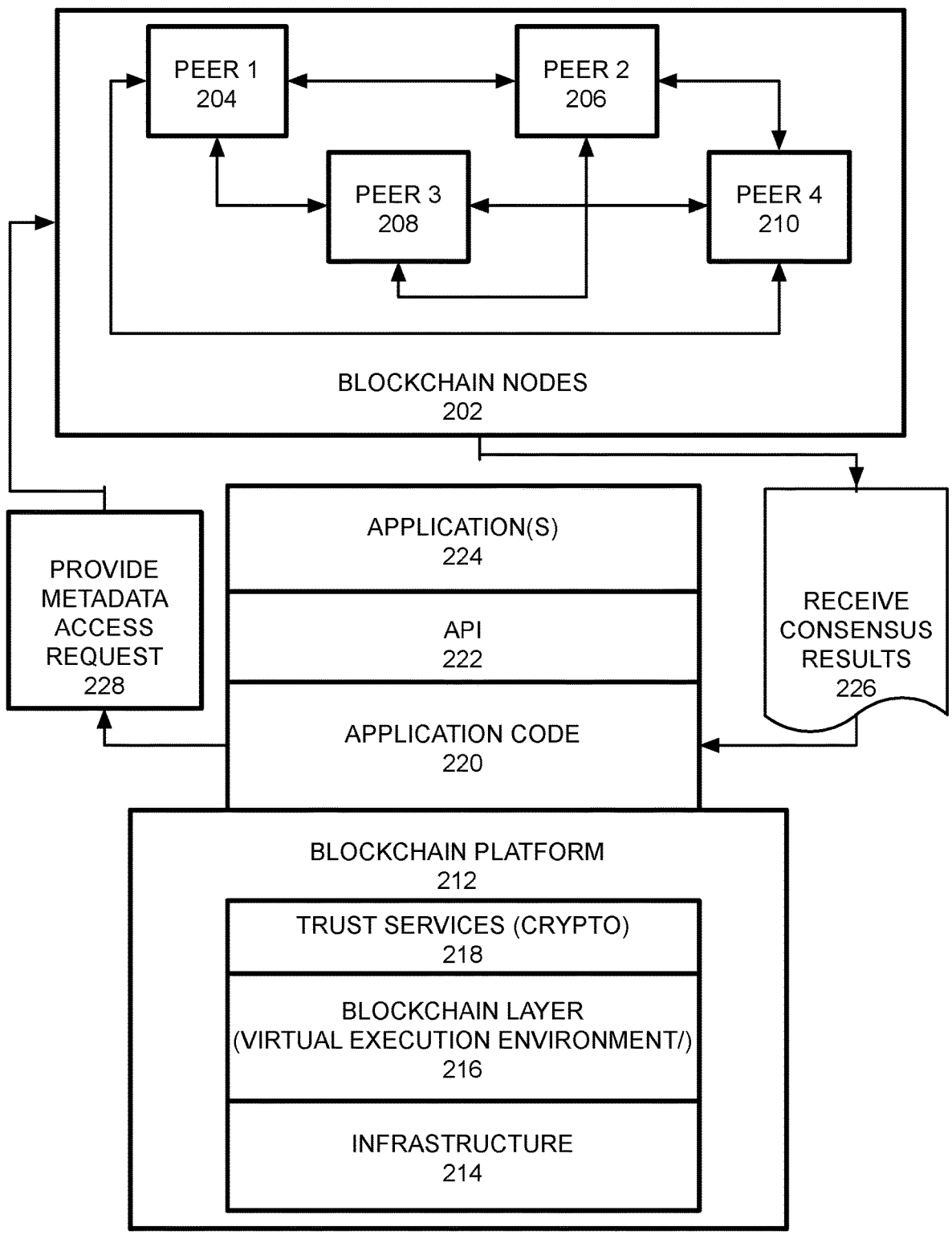
FIG. 2A illustrates an example peer node blockchain architecture configuration for tie-breaking consensus decisions, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (four nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, in one example, certain metadata sets may be received 228 by the peer nodes. This may trigger a consensus decision with regard to ownership of a cluster group. The consensus may be performed to reach a tie-breaking decision with regard to the node configuration on the network in a split-brain type of network failure scenario. The consensus results 226 are received and a decision is made. The results of the decision are updated in the blockchain ledger data.

Figure 2B:
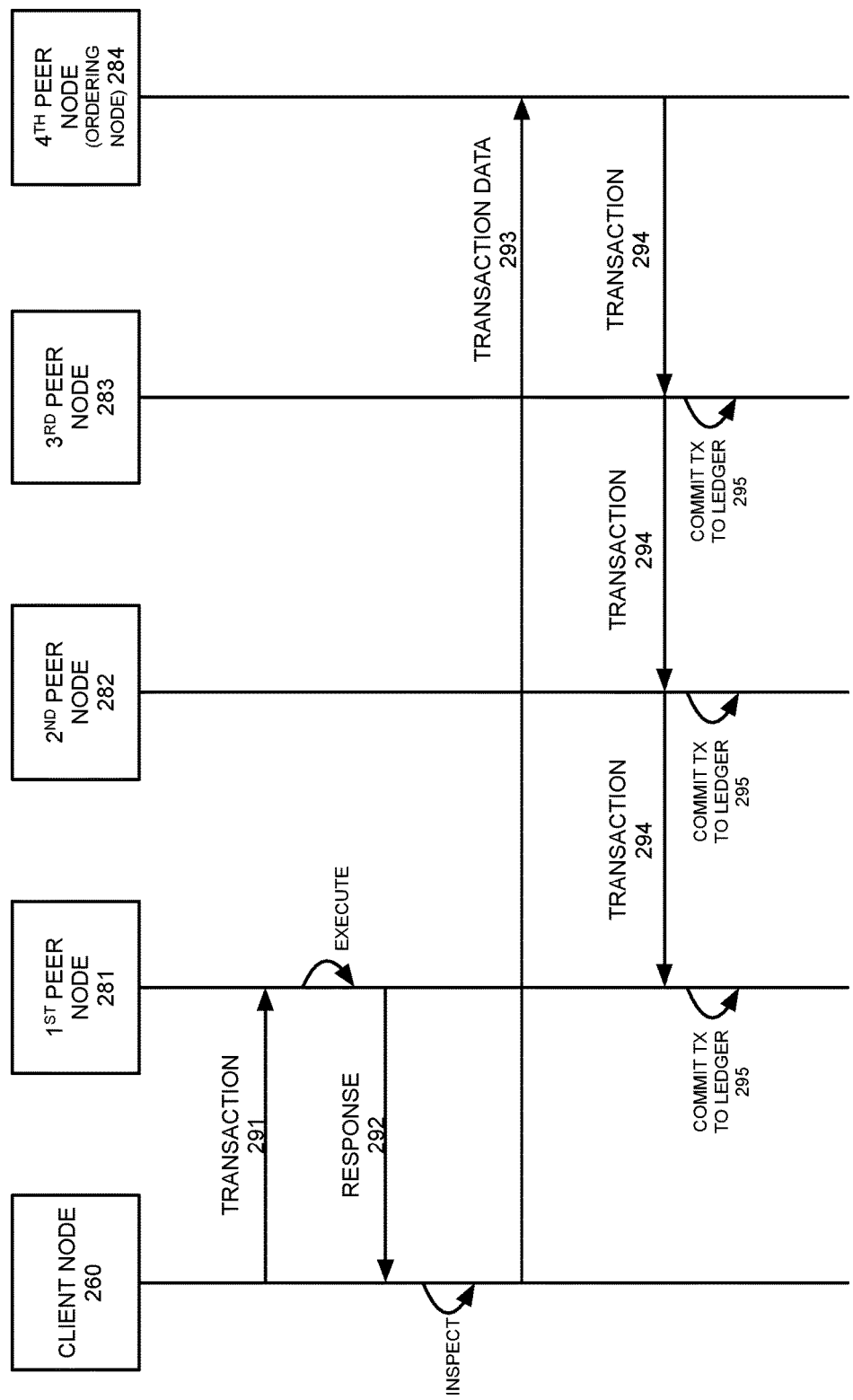
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
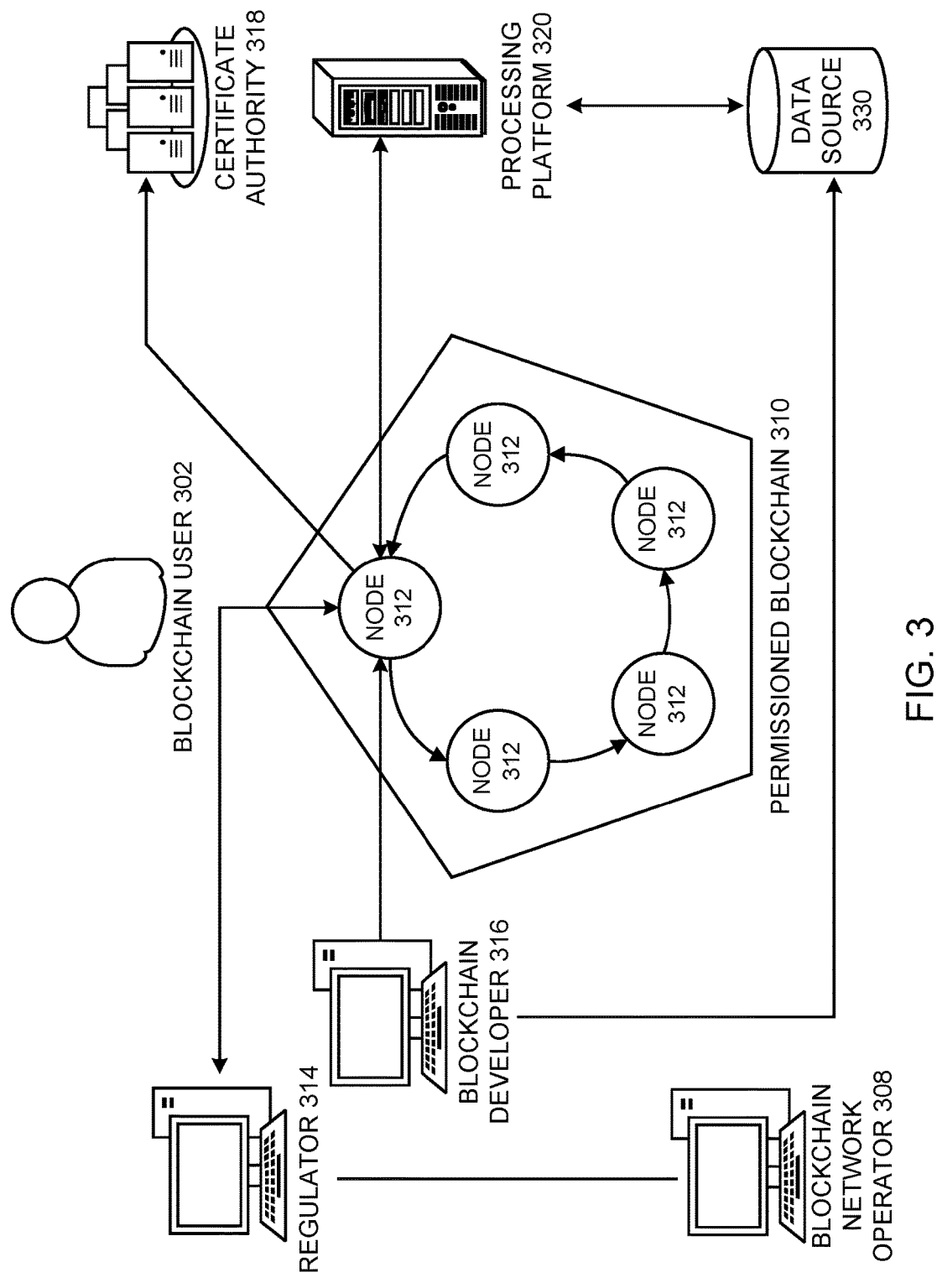
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
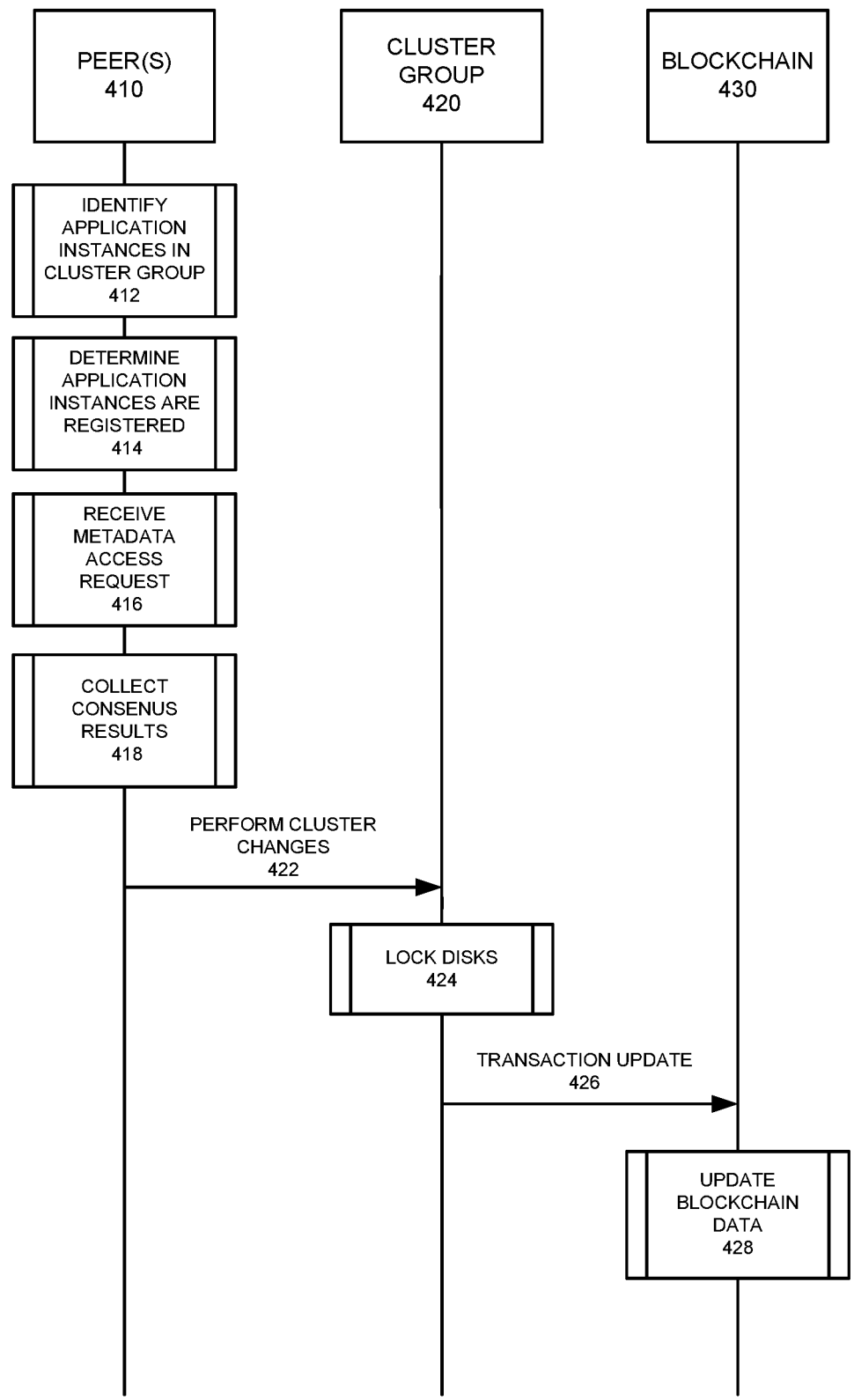
FIG. 4 illustrates a system messaging diagram for performing a tie-breaking consensus, according to example embodiments.

FIG. 4 illustrates a system messaging diagram for performing a tie-breaking consensus, according to example embodiments. Referring to FIG. 4, the system configuration 400 provides a group of peers 410, a cluster group of application instances 420, which may be operating on the blockchain nodes and occupying one or more data storage disks, and the ledger blockchain 430. In operation, one or more peers may identify the application instances in a cluster group 412, determine the instances are registered 414, and receive a metadata access request 416 to determine which nodes are part of the cluster in an emergency mode of operation, such as a failed node scenario where a split-brain scenario may occur. The metadata access request 416 may be received and may create a scenario where a consensus vote is required. The consensus results 418 may then be identified as they are received from the peer nodes. The cluster changes are then performed based on the result of the consensus 422 and the result is the cluster group may be reformed to include certain known nodes which are operational. One result may be to lock the disks 424 and perform a transaction update 426 to update the blockchain data 428 to reflect the changes.

Figure 5:
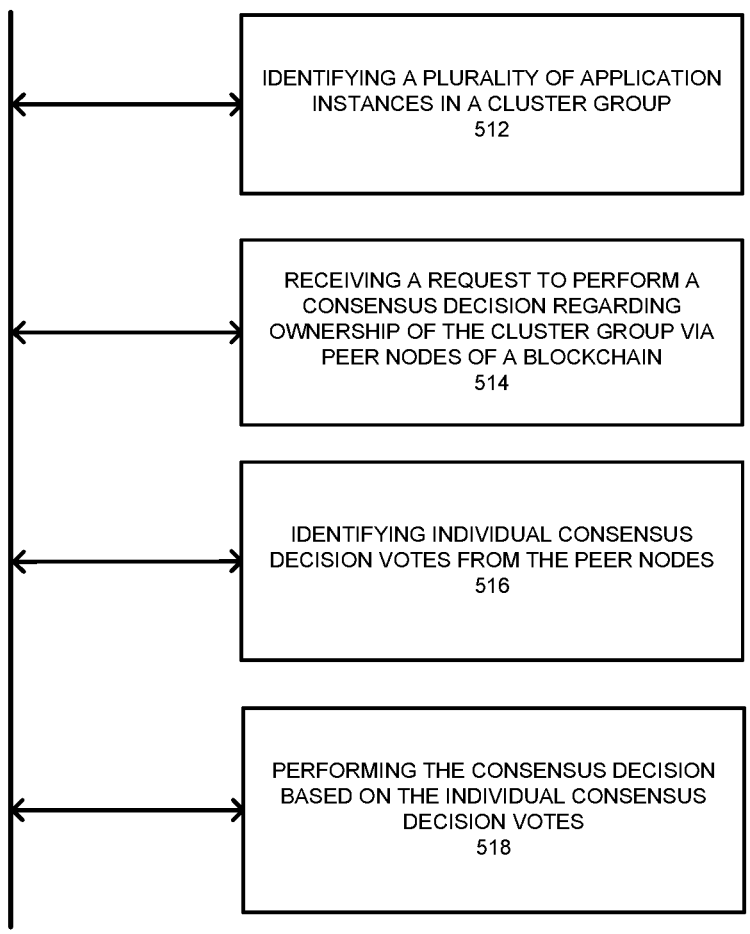
FIG. 5 illustrates a flow diagram of an example method of network node management in a blockchain, according to example embodiments.

FIG. 5 illustrates a flow diagram of an example method of network node management in a blockchain, according to example embodiments. Referring to FIG. 5, the method may include identifying a plurality of application instances in a cluster group 512, receiving a request to perform a consensus decision regarding ownership of the cluster group via peer nodes of a blockchain 514, identifying individual consensus decision votes from the peer nodes 516 and performing the consensus decision based on the individual consensus decision votes 518.

The method may also include determining the plurality of application instances are registered on a blockchain, and responsive to determining the plurality of application instances are registered on the blockchain, performing the consensus decision. The method may also include determining a quorum of the plurality of application instances (i.e., majority) have reached consensus regarding the ownership of the cluster group, and granting ownership of the cluster group to the quorum of the plurality of application instances. Responsive to determining the quorum of the plurality of application instances have been reached, the method may include locking one or more disks used by the plurality of application instances, and granting access of the one or more disks to the quorum of the plurality of application instances. The method may also include determining one or more of the peer nodes of the cluster group has failed, reforming the cluster group with available ones of the one or more peer nodes based on the consensus decision, transmitting an update transaction, comprising reformed cluster group information, to the blockchain, and storing the update transaction on the blockchain.

Figure 6A:
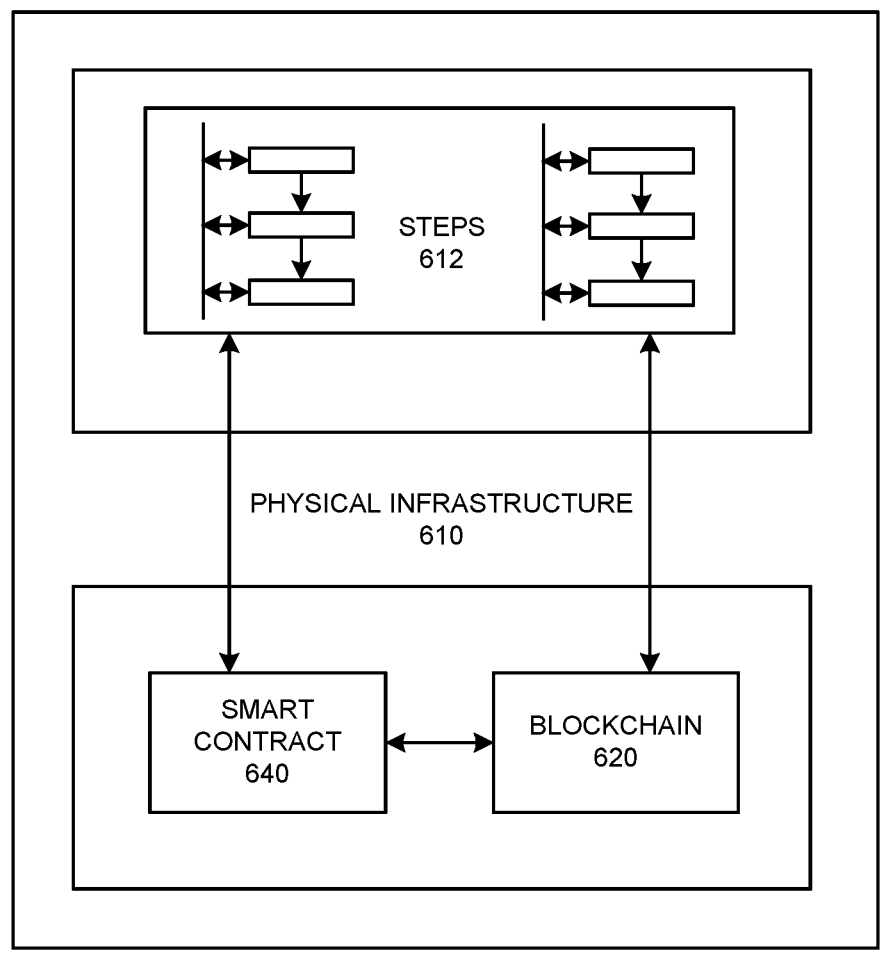
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
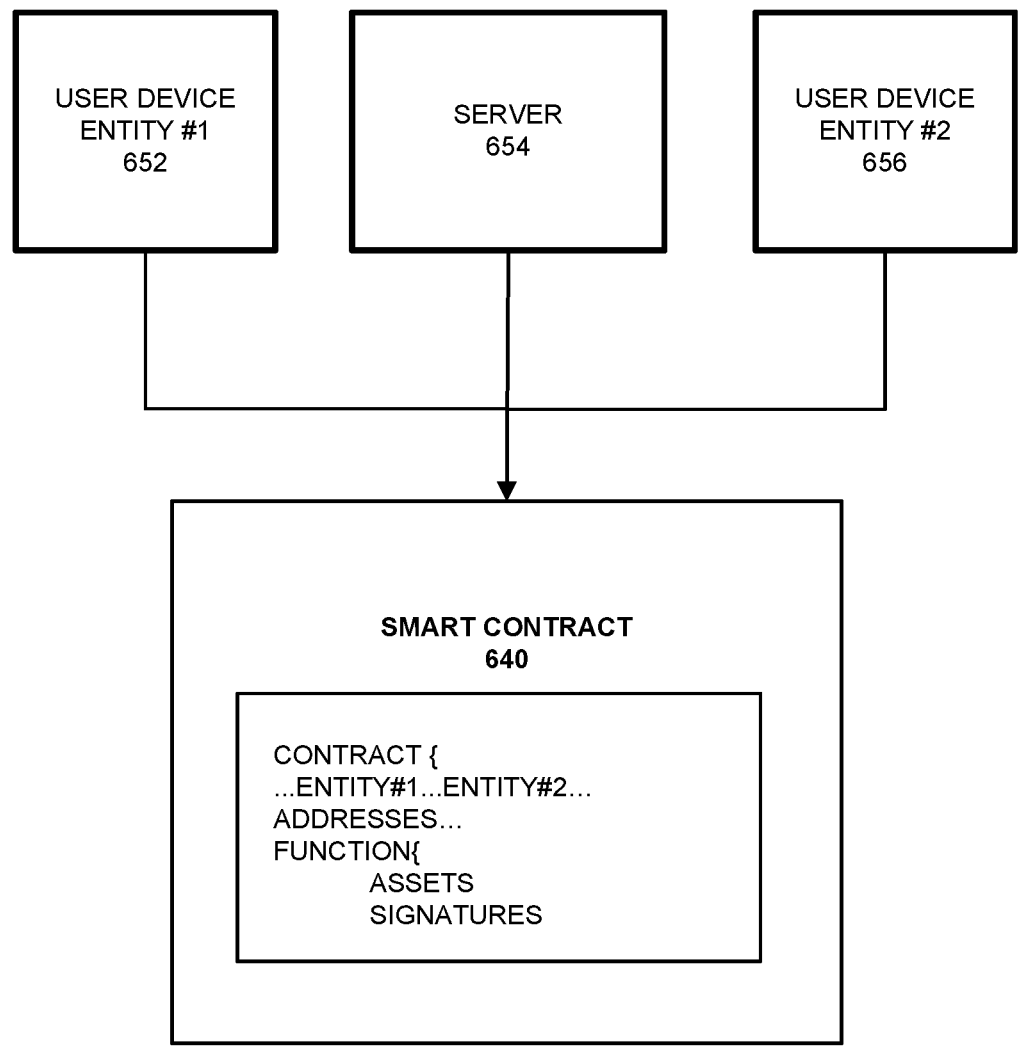
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
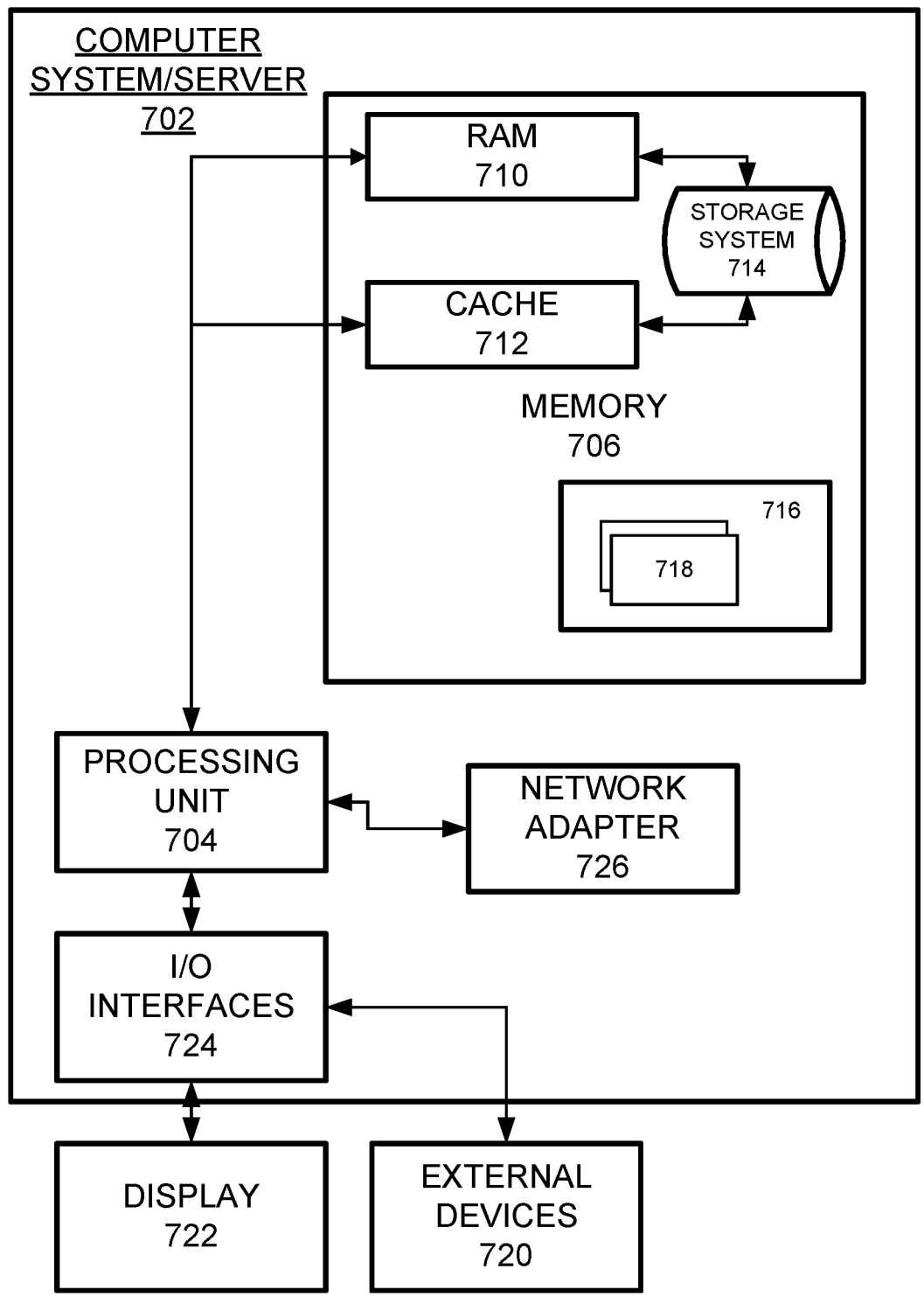
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    connecting a plurality of application instances of a plurality of storage nodes to a quorum as a service implemented by a plurality of blockchain peers of a blockchain ledger via a blockchain application programming interface (API), wherein the quorum as a service is configured to select a tie breaker based on a quorum of the plurality of blockchain peers;
    receiving, via the plurality of blockchain peers from the plurality of application instances connected via the blockchain API, a request to resolve a split-brain among storage nodes of a cluster group that includes the plurality of storage nodes;
    generating, via the quorum as a service, a tie-breaking decision which resolves the split-brain among the storage nodes of the cluster group and grants ownership of the cluster group to a storage node of the cluster group based on a quorum of votes of the plurality of blockchain peer nodes identified during a blockchain consensus process among the plurality of blockchain peer nodes;
    transmitting, via the quorum as a service, the tie-breaking decision granting the ownership of the cluster group to the storage node to a subsystem of the cluster group; and
    reforming the cluster group based on the tie-breaking decision to include known nodes which are operational and updating, via the quorum as a service of the blockchain ledger, the distributed metadata with information about the reformed cluster group.

2. The method of claim 1, further comprising:
    determining whether the plurality of application instances are registered on the blockchain ledger; and
    responsive to determining the plurality of application instances are registered on the blockchain ledger, executed the blockchain consensus among the plurality of blockchain peers of the quorum as a service.

3. The method of claim 1, wherein the granting comprises granting the ownership of the cluster group to a quorum of the plurality of storage nodes of the cluster group.

4. The method of claim 1, further comprising:
    locking one or more disks used by the plurality of storage nodes; and
    granting access of the one or more locked disks to the storage node that is granted the ownership of the cluster group.

5. The method of claim 1, further comprising:
    determining one or more of the plurality of storage nodes of the cluster group has failed.

6. The method of claim 1, further comprising:
    transmitting an update blockchain transaction comprising information about the reformed cluster group to the blockchain ledger; and
    storing the update blockchain transaction on the blockchain ledger.

7. An apparatus, comprising:
    a processor configured to
        connect a plurality of application instances of a plurality of storage nodes to a quorum as a service implemented by a plurality of blockchain peers of a blockchain ledger via a blockchain application programming interface (API), wherein the quorum as a service is configured to select a tie breaker based on a quorum of the plurality of blockchain peers;
        receive, via the plurality of blockchain peers from the plurality of application instances connected via the blockchain API, a request to resolve a split-brain among storage nodes identified during a blockchain consensus process among the plurality of blockchain peer nodes;
        generate, via the quorum as a service, a tie-breaking decision which resolves the split-brain among the storage nodes of the cluster group and grants ownership of the cluster group to a storage node of the cluster group based on a quorum of votes of the plurality of blockchain peer nodes of the quorum as a service of the blockchain ledger;
        transmit, via the quorum a service, the tie-breaking decision granting the ownership of the cluster group to the storage node to a subsystem of the cluster group; and
        reform the cluster group based on the tie-breaking decision to include known nodes which are operational and update, via the quorum as a service of the blockchain ledger, the distributed metadata with information about the reformed cluster group.

8. The apparatus of claim 7, wherein the processor is further configured to:
   determine whether the plurality of application instances are registered on the blockchain ledger; and
   responsive to a determination that the plurality of application instances are registered on the blockchain ledger, execute the blockchain consensus among the plurality of blockchain peers of the quorum as a service.

9. The apparatus of claim 7, wherein the processor is configured to grant the ownership of the cluster group to a quorum of the plurality of storage nodes of the cluster group.

10. The apparatus of claim 7, wherein the processor is further configured to:
    lock one or more disks used by the plurality of storage nodes; and
    grant access of the one or more disks to the storage node granted the ownership of the cluster group.

11. The apparatus of claim 7, wherein the processor is further configured to determine one or more of the storage nodes of the cluster group has failed.

12. The apparatus of claim 7, wherein the processor is further configured to transmit an update blockchain transaction comprising information about the reformed cluster group to the blockchain ledger and store the update blockchain transaction on the blockchain ledger.

13. A non-transitory computer readable storage medium configured to store instructions that when executed cause a processor to perform:
    connecting a plurality of application instances of a plurality of storage nodes to a quorum as a service implemented by a plurality of blockchain peers of a blockchain ledger via a blockchain application programming interface (API), wherein the quorum as a service is configured to select a tie breaker based on a quorum of the plurality of blockchain peers;
    receiving, via the plurality of blockchain peers from the plurality of application instances connected via the blockchain API, a request to resolve a split-brain among storage nodes of a cluster group that includes the plurality of storage nodes;
    generating, via the quorum as a service, a tie-breaking decision which resolves the split-brain among the storage nodes of the cluster group and grants ownership of the cluster group to a storage node of the cluster group based on a quorum of votes of the plurality of blockchain peer nodes identified during a blockchain consensus process among the plurality of blockchain peer nodes;
    transmitting, via the quorum as a service, the tie-breaking decision granting the ownership of the cluster group to the storage node to a subsystem of the cluster group; and
    reforming the cluster group based on the tie-breaking decision to include known nodes which are operational and updating, via the quorum as a service of the blockchain ledger, the distributed metadata with information about the reformed cluster group.

14. The non-transitory computer readable storage medium of claim 13, wherein the processor is further configured to perform:
    determining whether the plurality of application instances are registered on the blockchain ledger; and
    responsive to determining the plurality of application instances are registered on the blockchain ledger, executing the blockchain consensus among the plurality of blockchain peers of the quorum as a service.

15. The non-transitory computer readable storage medium of claim 13, wherein the granting comprises granting the ownership of the cluster group to a quorum of the plurality of storage nodes of the cluster group.

16. The non-transitory computer readable storage medium of claim 13, wherein the processor is further configured to perform:
    locking one or more disks used by the plurality of storage nodes; and
    granting access of the one or more locked disks to the storage node that is granted the ownership of the cluster group.

17. The non-transitory computer readable storage medium of claim 13, wherein the processor is further configured to perform:
    reforming the cluster group with available ones of the plurality of storage nodes based on the tie-breaking decision;
    transmitting an update blockchain transaction comprising information about the reformed cluster group to the blockchain ledger; and
    storing the update blockchain transaction on the blockchain ledger.

* * * * *